United States Patent Office 3,313,862
Patented Apr. 11, 1967

3,313,862
MODIFICATION OF POLYETHYLENE TEREPH-
THALATE WITH POLYCARBONATE
Erhard Siggel, Laudenbach am Main, and Hilmar Roedel,
Elsenfeld, Germany, assignors to Vereinigte Glanzstoff-
Fabriken AG, Wuppertal-Elberfeld, Germany
No Drawing. Filed Mar. 8, 1963, Ser. No. 263,728
Claims priority, application Germany, Mar. 9, 1962,
V 22,146
6 Claims. (Cl. 260—860)

This invention relates to the modification of polyethylene terephthalate with a small amount of a polycarbonic acid ester of 4,4'-dihydroxydiphenyl-2,2-propane. More particularly, the invention is concerned with the formation of a novel high molecular weight polycondensate of diethylene glycol terephthalate and, as a modifying agent, a high molecular weight polycarbonic acid ester of 4,4'-dihydroxydiphenyl-2,2-propane.

A number of processes have been described in the prior art for the modification of linear polyesters, such as polyethylene terephthalate, in order to change or improve the fiber and textile properties of the polymer. For example, in order to increase the absorption capacity of the fiber for dispersion dyestuffs, mixtures of acids and/or glycols have been used in the production of modified polyesters of terephthalic acid diglycol esters. In this connection, co-polycondensates have been prepared which consist essentially of terephthalic acid and ethylene glycol together with other glycols, such as butane diol and pentane diol. Similarly, co-polycondensates have been made from ethylene glycol and terephthalic acid together with other acids, such as isophthalic acid or the mono-sodium sulfonic acid salt of 5-sulfo-isophthalic acid.

These known co-polycondensates have not been widely accepted, because they all suffer from the disadvantage that their softening ranges or melting points are substantially lower than those of the unmodified, pure polyethylene terephthalate. Thus, the only advantage of a polyester containing the mono-sodium-5-sulfo-isophthalic acid is its affinity for basic dyestuffs, this affinity arising because the polymer is more easily saponified. In practice, however, it is difficult to utilize this dyeing advantage, and conventional dyeing methods for such polyester materials must be used with great caution and in some cases cannot be used at all, for example, where a reductive after-treatment is required. Furthermore, even in a neutral pH range, these prior co-polycondensate products exhibit a marked instability with respect to agents having a hydrolyzing effect. Fibers or textile fabrics of such co-polycondensates also have a very poor crease recovery, especially in the wet state, and this lack of crease resistance is probably caused by the increased moisture absorption of the modified polyester.

One object of the present invention is to provide a process for the preparation of a modified polyethylene terephthalate whereby the resulting modified polyester will exhibit an improved affinity for dyestuffs without losing the desirable properties of the unmodified polyester.

Another object of the invention is to provide a novel polyester product which has an improved appearance and a better melt stability by comparison with the unmodified polyethylene terephthalate.

Still another object of the invention is to provide a modified polyethylene terephthalate which is equally useful for the production of articles by injection molding as well as for the spinning of fibrous or filamentary products.

These and other objects and advantages of the present invention are described more fully in the following detailed specification.

It has now been found, in accordance with the present invention, that it is possible to obtain a modified high molecular weight polyester product with a number of improved properties if diethylene glycol terephthalate is polycondensed in the usual manner in the presence of a polycarbonic acid ester of 4,4'-dihydroxydiphenyl-2,2-propane as a modifying agent in an amount up to 15% by weight, with reference to the total polyester content. The polycarbonic acid ester can be added to the diethylene glycol terephthalate monomer at the beginning of or during the polycondensation reaction, preferably within the first one-third of the polycondensation reaction. In general, the modifying agent should be added in an amount of at least 0.5% up to 15% by weight, and it is most advantageous to employ about 3 to 6% by weight of the polycarbonic acid ester. After this addition of the modifying agent, the condensation reaction is completed in the usual manner so as to obtain a high molecular weight linear polyester.

The polycarbonic acid ester of 4,4'-dihydroxydiphenyl-2,2-propane as a modifying agent can be represented by the formula

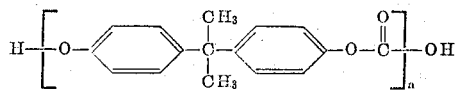

and should have a mean molecular weight of at least about 15,000 up to about 80,000. Those polycarbonic acid esters having a mean molecular weight of 50,000 to 70,000 are especially suitable for the purposes of the present invention. The polycarbonic acid ester can be added to the condensation reaction medium in powdered or granulated form and rapidly dissolved so as to be readily dispersed in the reaction medium by mechanical agitation. The preparation of 4,4'-dihydroxydiphenyl-2,2-propane and its subsequent conversion into the polycarbonic acid ester are described in detail by H. Schnell in "Polycarbonate, eine Gruppe neuartiger thermoplastischer Kunststoffe," Angewandte Chemie, 68. Jahrgang, Nr. 20, pages 633–660 (Oct. 21, 1956). The initial 4,4'-dihydroxydiphenyl-2,2-propane and its resulting polycarbonic acid ester are preferably obtained in pure form, i.e., in the absence of any extensive side reactions or contaminating by-products.

It will be apparent that the major component of the modified polyester of this invention is the monomeric diethylene glycol terephthalate normally used in the production of polyethylene terephthalate. Thus, the co-polycondensate of the invention should usually contain at least about 85% by weight of this monomer in condensed form. The preferred modified polyesters of this invention are those which consist essentially of the diethylene glycol terephthalate component polycondensed with the polycarbonic acid ester component, and such preferred polyester products should normally contain not more than 5% by weight, and preferably less than 1% by weight, of other glycol or acid modifying agents. Of course, dyestuffs and fillers or the like can be subsequently added without changing or substantially modifying the essential and desirable characteristics of the new polyester. These and other minor alterations can be made in the polyester composition without departing from the spirit and scope of the present invention.

The diethylene glycol terephthalate component of the invention is most easily obtained by the usual ester interchange of dimethyl terephthalate with ethylene glycol in the presence of a conventional transesterification catalyst. The transesterification product, in which the diethylene glycol terephthalate can already be partly condensed, may be used directly with the addition of the polycarbonic acid ester modifying agent, and the reaction mixture then subjected to polycondensation according to conventional batch or continuous polymerization methods.

Thus, the polycondensation reaction is normally carried out at temperatures up to about 300° C., preferably about 280° C., under a high vacuum and/or in the presence of an inert gas. Also, the polycondensation is carried out for a period of time sufficient to give a linear polyester having a mean molecular weight of at least about 9,500.

Where the polyester product of this invention is to be commercially employed in the form of textile filaments or fibers, it is generally desirable to obtain a product having a molecular weight of about 10,000 to 25,000, and where the end product is to be used in the manufacture of molded articles without being stretched or oriented, it is generally desirable to obtain a molecular weight of about 25,000 to 30,000. The term "high molecular weight" is employed herein and in the accompanying claims with reference to the foregoing overall range of molecular weights. The term "fiber-forming polyester" is used herein with reference to a linear polyester having a sufficiently high molecular weight to be spun and stretched into an oriented fiber or filament.

Suitable catalysts for the ester interchange reaction and the subsequent polycondensation reaction include the familiar metal, metal oxide or metal salt catalysts such as zinc acetate and antimony trioxide. As in the normal polycondensation of the unmodified polyester, the amount of catalyst and the period of time for the condensation reaction can be varied over a relatively broad range, and the final molecular weight of the polyester product can be easily determined by measurement of the melt viscosity.

The modified linear polyesters obtained according to the polycondensation process of the present invention are distinguished in part by the fact that their softening point is only slightly lower than the unmodified polyethylene terephthalate. For example, a polyethylene glycol terephthalate modified with 10% by weight of the polycarbonic acid ester modifying agent softens or melts at a temperature of only about 4–5° C. lower than does the pure polyethylene glycol terephthalate. In addition, molded articles or textile products such as filaments and fibers produced from the modified polyesters of the invention are completely unyellowed and actually exhibit a brightness which is not obtained with the corresponding products of the unmodified polyester. The fibrous products of the invention also show good crease-resistance in both the dry state and the moist state, and these fibrous products are highly stable to chemical agents which tend to cause saponification.

The modified fiber-forming polyesters of the invention are especially useful in textile materials because they can be very deeply dyed with dispersion dyestuffs, preferably by the so-called carrier dyeing method in which the fiber is dyed in the presence of a swelling agent in the form of a suitable organic solvent. The dyeing properties of the modified polyesters are quite excellent even with a relatively small addition of about 3 to 6% by weight of the polycarbonic acid ester. In addition, any of the methods commonly employed for dyeing polyesters can be used with the fibrous modified polyester products of the present invention, and no special techniques are required because the modified polyesters have a stability against saponification which is equal to the stability of the unmodified polyethylene terephthalate.

Surprisingly, it was found that the addition of the polycarbonic acid ester modifying agent also causes a considerable improvement in the thermal stability of the polyester product. In the unmodified polyethylene terephthalate and also in the known co-polycondensates, the polyester decomposes quite rapidly after it has been melted, and the decomposition reaction causes not only a severe reduction in the degree of polymerization, i.e., a reduction of the molecular weight as measured by the melt viscosity, but also produces decomposition products which remain in the polymer and make it quite difficult to extrude or otherwise mold and work the final product. By comparison, the modified polyesters according to the present invention have a much improved melt stability. For example, unmodified polyethylene terephthalate undergoes a viscosity reduction of 25–27% when maintained at 280° C. for a period of 30 minutes, whereas the modified polyethylene terephthalate containing 5% by weight of the polycarbonic acid ester as obtained by the present invention undergoes a viscosity reduction of only 12% when heated at the same temperature and for the same period of time. This melt stability of the new polyester is especially advantageous in the injection molding of shaped articles. Moreover, the addition of the polycarbonic acid ester modifying agent retards the crystallization speed of the polyethylene terephthalate, thereby facilitating the extrusion or injection molding of the polyester and also improving the mold stability of the shaped products.

The following examples provide a specific illustration for the preparation of the modified polyethylene terephthalate in accordance with the present invention. The invention is not considered as being restricted to these specific examples.

*Example 1*

50 kg. of dimethyl terephthalate were transesterified with 44.5 kg. of ethylene glycol in the presence of 0.015% by weight of zinc acetate and 0.02% by weight of antimony trioxide in an autoclave equipped with an agitator and a distillation column. The reaction components were heated to 160° C., and in the course of the next 2 hours the temperature of the reaction was raised to 200° C. and the liberated methanol distilled off. By further raising the temperature to 230° C., 14 liters of glycol were then removed by distillation. 3 kg. of a 4,4'- dihydroxy-diphenyl-2,2-propane-polycarbonic acid ester which had a mean molecular weight of 50,000 and a solution viscosity of 1.67 (measured as a 1% solution in m-cresol at 20° C.) were stirred in pulverized form into the reaction melt over a period of 10 minutes. A vacuum was applied and within the next 45 minutes the temperature was brought to 280° C. During this same time the pressure in the reaction vessel was lowered to 1.0 mm. Hg. Polycondensation was carried out under these conditions for another hour, during which a final vacuum of 0.5 mm. Hg was achieved. The polyester reaction product was drawn off as a band in liquid form and solidified. After being broken up into particles, the solid polyester was in a form suitable for the production of extruded or spun products from a melt. The modified polyester had a solution viscosity of 1.50 (measured as a 1% solution in m-cresol at 20° C.) and a melting point of 258.5° C. It was possible to produce filaments from this polyester by the conventional melt spinning process, and these filaments were dyed very deeply with the dispersion dyestuff Palanil Blue R in the presence of an organic swelling agent as a carrier.

*Example 2*

100. kg. of dimethyl terephthalate were transesterified with 89 kg. of ethylene glycol in the presence of 0.015% by weight of zinc acetate and 0.02% by weight of antimony trioxide. For this transesterification, the reactants were heated to 160° C. and the temperature was then raised within 2 hours to 200° C. while distilling off the liberated methanol. A further temperature elevation to 230° C. brought about the distillation of 28 liters of glycol. Thereafter, 10 kg. of the polycarbonic acid ester of 4,4'-dihydroxydiphenyl - 2,2 - propane (mean molecular weight=50,000) in granulated form were stirred into the ester-interchange product within a period of 20 minutes. Further condensation was then carried out under the same conditions as described in Example 1. The resulting polycondensation product had a solution viscosity of 1.65 (measured as a 1% solution in m-cresol at 20° C.) and a melting point of 256.8° C. The polyester produced in this manner could be easily processed into injection-molded articles capable of being deeply dyed.

Since co-polycondensates of polyethylene terephthalate have generally been observed to improve only one property of the polyester at the expense of a number of other desirable properties, it was quite unusual to find that the polycarbonic acid ester modifying agent of the present invention permits an improvement in the dyeability of the polyester without any substantial reduction in such properties as resistance to saponification, crease-resistance, high melt viscosity and the like. In addition, the modified polyester of the present invention exhibits an unusual improvement in the melt stability and a slower crystallization in the molded product. All of these factors contribute to a highly improved polyester in the form of a modified polyethylene terephthalate, and this improvement is achieved without departing from conventional techniques in the reaction conditions and apparatus required for production and use of the polyester product.

The invention is hereby claimed as follows:

1. A process for the production of a modified high molecular weight fiber-forming polyester which comprises: co-polycondensing diethylene glycol terephthalate with about 0.5 to 6% by weight of a polycarbonic acid ester of 4,4'-dihydroxydiphenyl-2,2-propane, said polycarbonic acid ester having a mean molecular weight of at least about 15,000 up to about 80,000.

2. A process as claimed in claim 1 wherein said polycarbonic acid ester has a mean molecular weight of about 50,000 to 70,000.

3. A process as claimed in claim 2 wherein said polycarbonic acid ester is added for said co-polycondensation in an amount of about 3 to 6% by weight.

4. The high molecular weight fiber-forming co-polycondensation product of (A) diethylene glycol terephthalate and (B) from about 0.5 to 6% by weight of a polycarbonic acid ester of 4,4'-dihydroxydiphenyl-2,2-propane, said polycarbonic acid ester having a mean molecular weight of at least 15,000 up to about 80,000.

5. The product as claimed in claim 4 wherein said polycarbonic acid ester has a mean molecular weight of about 50,000 to 70,000.

6. The product as claimed in claim 5 wherein the content of said polycarbonic acid ester is about 3 to 6% by weight.

References Cited by the Examiner

UNITED STATES PATENTS

| | | | |
|---|---|---|---|
| 3,000,849 | 9/1961 | Clachan et al. | 260—860 |
| 3,218,372 | 11/1965 | Okamura et al. | 260—860 |

FOREIGN PATENTS

| | | | |
|---|---|---|---|
| 1,302,051 | 7/1962 | France | 260—860 |
| 1,303,888 | 8/1962 | France | 260—860 |

MURRAY TILLMAN, *Primary Examiner.*

J. T. GOOLKASIAN, *Assistant Examiner.*